United States Patent
West et al.

(10) Patent No.: US 8,776,929 B2
(45) Date of Patent: Jul. 15, 2014

(54) HYBRID POWER SYSTEM WITH BIDIRECTIONAL MACHINE AT FLYWHEEL

(75) Inventors: Sean P. West, Dubuque, IA (US); Mark J. Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 12 days.

(21) Appl. No.: 13/595,642

(22) Filed: Aug. 27, 2012

(65) Prior Publication Data

US 2014/0053683 A1 Feb. 27, 2014

(51) Int. Cl.
*B60K 6/00* (2006.01)
*B60K 8/00* (2006.01)

(52) U.S. Cl.
USPC .................. 180/165; 180/65.25; 180/65.28

(58) Field of Classification Search
USPC ........... 180/165, 65.25, 65.28, 65.235, 65.24, 180/65.27, 65.265
See application file for complete search history.

(56) References Cited

U.S. PATENT DOCUMENTS

| | | | | |
|---|---|---|---|---|
| 3,923,115 A | * | 12/1975 | Helling | 180/65.25 |
| 4,741,410 A | * | 5/1988 | Tunmore | 180/165 |
| 7,273,122 B2 | * | 9/2007 | Rose | 180/165 |
| 7,273,634 B2 | * | 9/2007 | Fitzgibbons, Jr. | 427/202 |
| 7,392,871 B2 | * | 7/2008 | Severinsky et al. | 180/65.28 |
| 7,455,134 B2 | * | 11/2008 | Severinsky et al. | 180/65.28 |
| 7,913,791 B2 | | 3/2011 | Rose et al. | |
| 8,365,851 B2 | * | 2/2013 | Deuble et al. | 180/65.265 |
| 2007/0111849 A1 | * | 5/2007 | Ji | 477/6 |
| 2009/0139788 A1 | * | 6/2009 | Miller | 180/165 |
| 2010/0186408 A1 | * | 7/2010 | Rose et al. | 60/629 |
| 2011/0048357 A1 | | 3/2011 | Wanner et al. | |

* cited by examiner

*Primary Examiner* — Hau Phan

(57) ABSTRACT

A hybrid power system for a vehicle which may include an internal combustion engine and a supplemental energy system for converting the mechanical energy generated by the engine to electrical energy and storing it as opportunity provides; and using the stored electrical energy to augment engine output as necessary. The supplemental energy system may include a motor-generator engaged with a flywheel.

9 Claims, 3 Drawing Sheets

HYBRID POWER SYSTEM WITH BIDIRECTIONAL MACHINE AT FLYWHEEL

FIELD OF THE INVENTION

This invention relates to hybrid vehicles and, in particular, hybrid vehicles having removable supplemental electrical power sources.

BACKGROUND OF THE INVENTION

Hybrid work vehicles are becoming more and more prevalent in today's world as such vehicles tend to have significantly improved fuel efficiencies. However, the improved fuel efficiencies must be weighed against other less positive factors. For example, hybrid vehicles tend to be significantly more complex and expensive than non-hybrid vehicles. Moreover, available work vehicles on the market tend to be all or nothing choices, i.e., they are either hybrid vehicles or non-hybrid vehicles. Some users may want hybrid vehicles under certain circumstances and non-hybrid under other circumstances.

SUMMARY OF THE INVENTION

A system and method are presented for achieving a hybrid drive as an option on a work vehicle. The inventors demonstrate now to accomplish this by, for example, hybridizing the work vehicle via mechanical connection of a motor-generator to the flywheel ring gear of the vehicle using an access hole in the bell housing normally reserved for a starter and adding motor-generator control software to the vehicle's engine controller. Such an arrangement tends to reduce or minimize interference with other equipment on the vehicle, i.e., tends to favorably address space constraints on work vehicles.

DESCRIPTION OF THE PREFERRED EMBODIMENT

Figure 1:
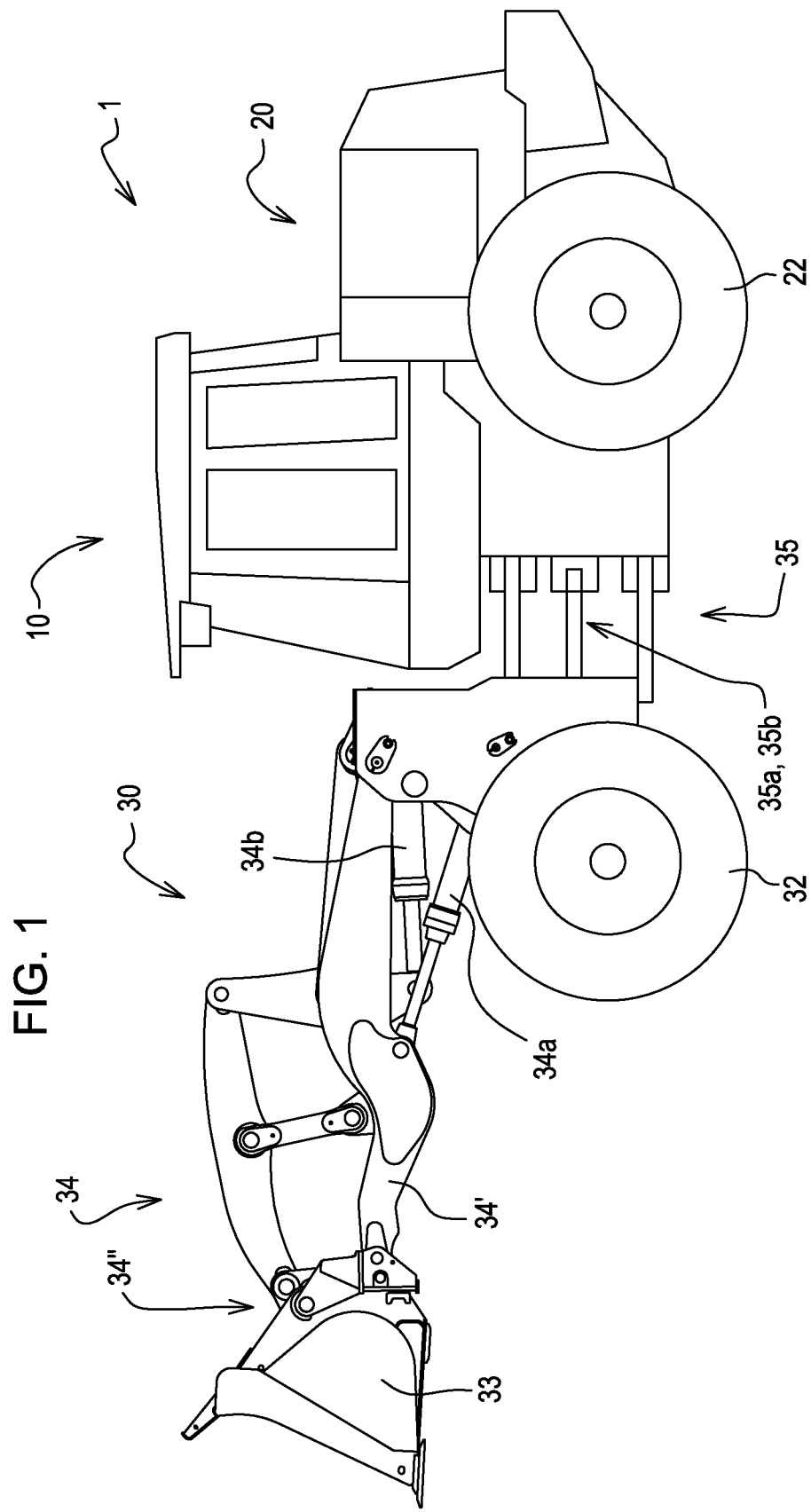
FIG. 1 illustrates an exemplary work vehicle utilizing the invention.

FIG. 1 illustrates an exemplary work vehicle which may benefit from the invention. The vehicle illustrated is a four wheel drive (4WD) loader 1 having: a cab 10; a rear body portion 20 with rear wheels 22; a front body portion 30 with front wheels 32, a bucket 33, a linkage 34 for working the bucket 33, and hydraulic cylinders 34*a* and 34*b* to power the linkage 34, and an articulation joint 35 allowing angular change between the front body portion 30 and the rear body portion 20. Hydraulic cylinders 35*a*, 35*b* enable angular changes between the front and rear body portions 30, 20 under hydraulic power derived from conventional hydraulic pumps (not shown).

Figure 2:
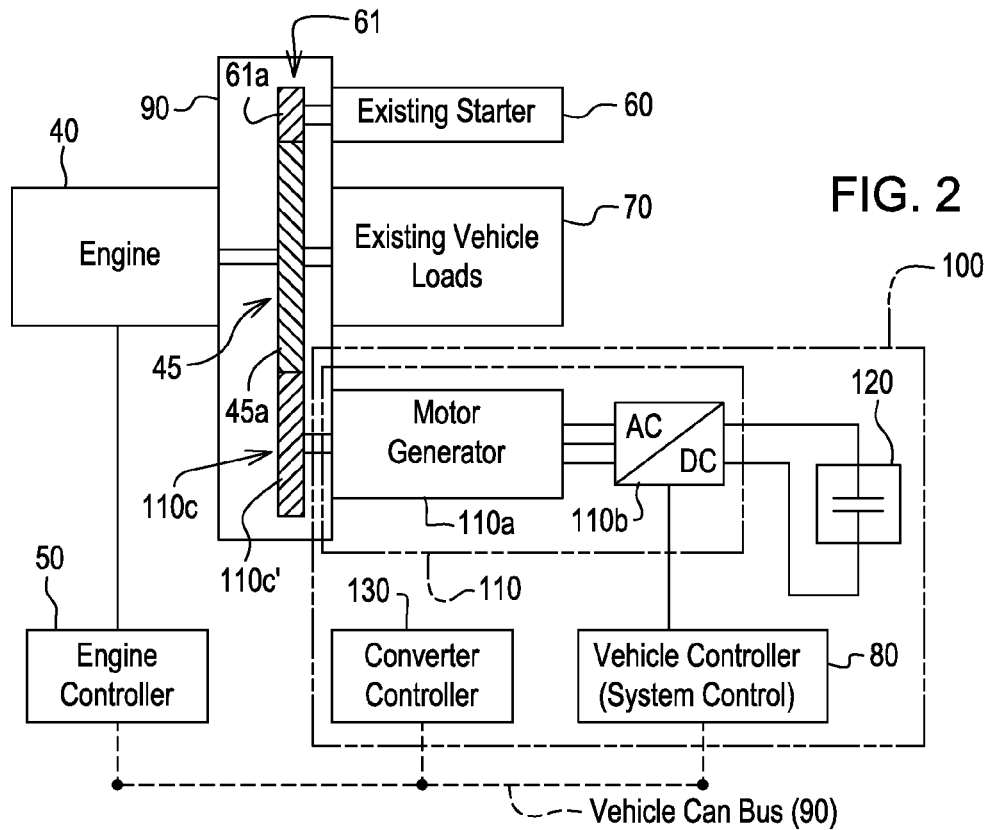
FIG. 2 illustrates a schematic for an exemplary embodiment of the invention.

FIG. 2 illustrates an exemplary schematic of a first embodiment of removable or optional supplemental energy system (SES) 100 after integration with an exemplary conventional work vehicle energy system. The conventional energy system illustrated may include: an engine 40; an engine controller 50; a starter 60; conventions vehicle loads 70; and a vehicle controller 80 for power management. The exemplary supplemental energy system 100 may include: a bidirectional electric machine 110 having a motor-generator 110*a* and a bidirectional AC-DC converter 110*b* where AC is alternating current and DC is direct current; a rechargeable electrical storage system (RESS) 120; a converter controller 130; and the vehicle controller 80. The particular RESS 120 illustrated is a capacitor but may be a battery or any other workable storage system designed to store electrical energy.

As illustrated, the vehicle controller 80 may be operatively connected to the engine controller 50 and the converter controller 130 for power management via control of the engine 40 and the supplemental energy system 100. As illustrated, the connections between the vehicle controller 80 and the engine and converter controllers 50, 130 may be accomplished via a conventional means such as for example, a CAN bus 81. Conventional vehicle loads may include, among other things, an alternator 71, a hydraulic pump 72, a water pump 73, and a transmission 74 for powering the front and rear wheels 32, 22.

Figure 3:
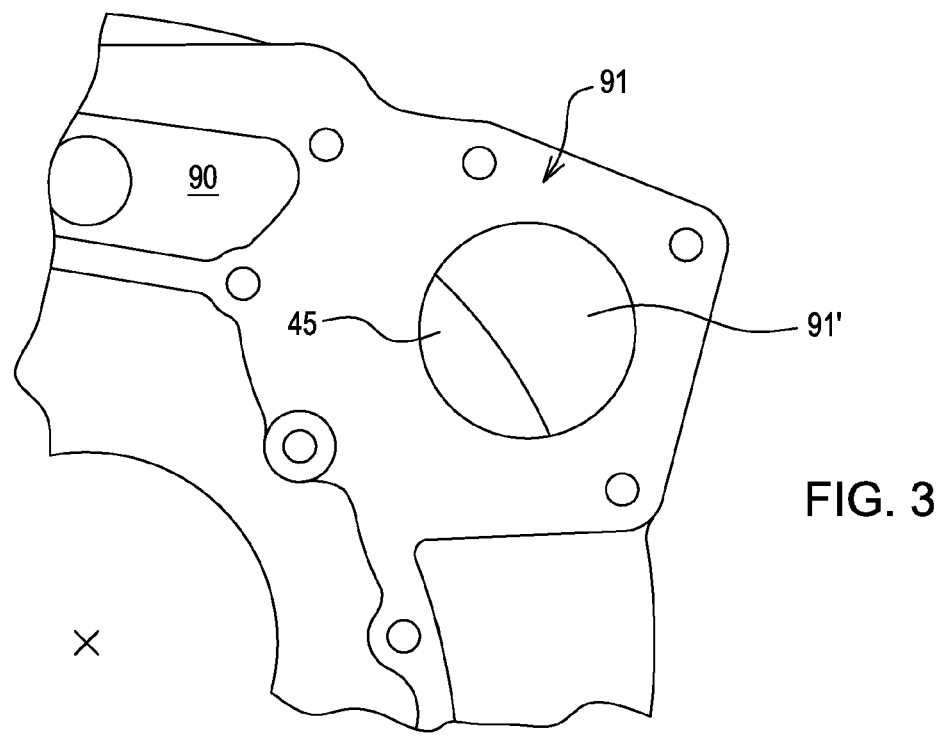
FIG. 3 illustrates an exemplary mounting flange on which the motor-generator may be attached.

As illustrated in FIG. 2, the motor-generator 110*a* may directly engage the flywheel 45 via the flywheel teeth 45*a* and the motor-generator engagement teeth 110*c*' of a motor-generator engagement gear 110*c* in the same manner as the starter 60 and the starter engagement teeth 61*a* of a starter engagement gear 61. As with the conventional starter 60, the motor-generator 110*a* may be attached to the bell housing 90, via a standard mounting flange 91 which may form a part of the bell housing 90 (as illustrated in FIG. 3). Such an arrangement may require a plurality of mounting flanges 91. However, the starter 60 and motor-generator 110*a* may indirectly engage the flywheel 45 via a gearbox 140 directly attached to a mounting flange 91 as illustrated in FIG. 4.

In operation, the starter 60 may be disengaged from the flywheel 45, via a conventional clutching arrangement (not shown) after engine startup. The bidirectional electric machine 110 may be continually engaged with the flywheel 45 and be directed to deliver electrical power received from the RESS 120 to the flywheel 45 in the form of torque; to receive power from the flywheel 45 in the form of torque and deliver it to the RESS 120 in the form of electrical power, or to float and run in neutral, neither generating nor delivering power to the flywheel 45. The bidirectional electric machine 110 directs power to the flywheel 45 by receiving electrical energy in the form of direct current (DC) from the RESS 120 via conventional electrical lines, converting DC to alternating current (AC) at the AC-DC converter 110*b* and supplying the AC to the motor-generator 110*a* which has been directed to act as a motor. The bidirectional electric machine 110 directs power to the RESS 120 by receiving energy from the flywheel 45 in the form of torque, converting the torque to AC via the motor-generator 110*a* which has been directed to act as a generator, converting the AC to DC via the AC-DC converter 110*b* and supplying the DC to the RESS 120 via conventional electrical lines.

As indicated in FIG. 2, the vehicle controller 80 may direct the engine 40 and the bidirectional machine 110 to power the vehicle 1, via signals to the engine controller 50 and the converter controller 130, in accordance with a control scheme effected via installed software. The control scheme may take many forms. For example, the vehicle controller 80 may direct the supplemental energy system 100 to deliver power to the flywheel 45 upon sensing a demand for an increase in mechanical power to accelerate the vehicle 1 when a signal from a conventional speed sensor indicates the speed of the vehicle 1 is below a predetermined speed in the desired direction of travel. The vehicle controller 80 may also direct the supplemental energy system 100 to deliver power to the flywheel 45 when it receives a signal from a control device such as, for example, a joystick, indicating that a demand is being made on the hydraulic pump (not shown) for operation of the hydraulic cylinders 34a, 34b which power the exemplary linkage 34 and bucket 33. The vehicle controller 80 may direct the supplemental energy system 100 to deliver power from the flywheel 45 to the RESS 120 during periods when the vehicle 1 is running at low demand. The vehicle controller 80 manages the direction of energy flow between the flywheel 45 and the RESS 120 by directing the AC-DC converter 110b via signals to the converter controller 130 which directly controls the AC-DC converter 110b.

Figure 4:
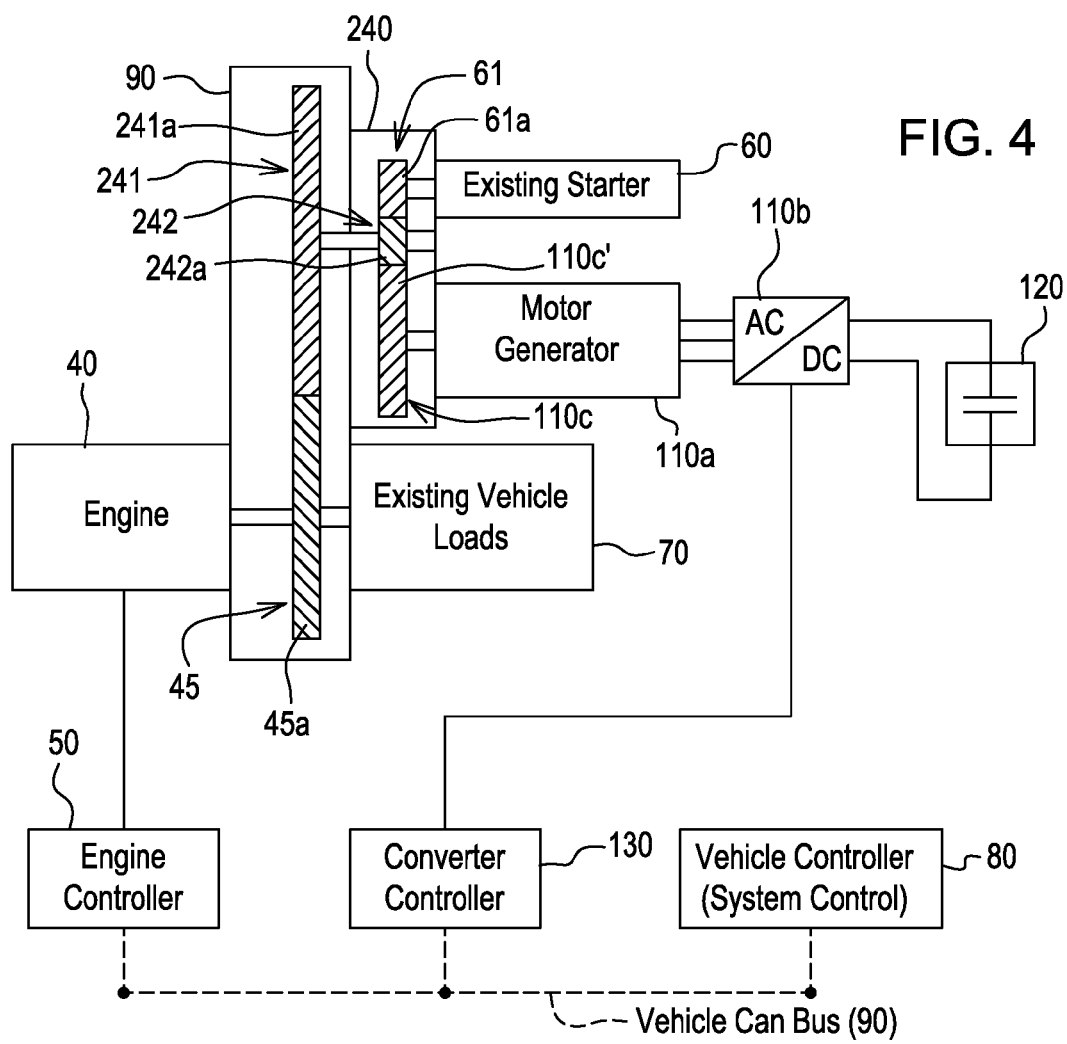
FIG. 4 illustrates a schematic for an alternative exemplary embodiment of the invention.

As illustrated in the schematic of FIG. 4, in a second embodiment, the starter 60 and the bidirectional machine 110 may be mechanically connected to the flywheel 45 via a conventional gearbox 240 engaging the flywheel 45 via the gearbox engagement teeth 241a of a gearbox engagement gear 241 and a gearbox transfer gear 242 in direct contact with the motor-generator engagement teeth 110c' and the starter engagement teeth 61a via transfer gear engagement teeth 242a and, as such, may utilize the same starter mounting flange 91 for torque transference. This arrangement may require the gearbox 240 to be directly attached to a starter mounting flange 91. In this second embodiment, the operation of the supplemental energy system 100 may remain the same as with the first embodiment of the invention. As with the first exemplary embodiment, the starter 60 may be disengaged after engine startup. The simple gearbox 240 illustrated is exemplary; it may take many forms and may, for example have reduction gearing and multiple transfer gears but must have at least two areas for output, i.e., at least an output area for the starter 60 and an output area for the bidirectional machine 110.

Having described the embodiments above, it will become apparent that various modifications can be made without departing from the scope of the invention as defined in the accompanying claims.

The invention claimed is:

1. A hybrid power system for a work vehicle having a power train and wheels for propelling the vehicle, the hybrid power system comprising:
   an engine;
   a flywheel with flywheel teeth;
   a flywheel housing;
   a first mounting flange;
   a second mounting flange;
   a starter engaged with the flywheel via the first mounting flange;
   a rechargeable electrical energy storage system;
   a bidirectional machine engaged with the flywheel via the second mounting flange such that a movement of the flywheel may result in a movement of a portion of the bidirectional machine and a movement of the portion of the bidirectional machine results in the movement of the flywheel, the bidirectional machine comprising a motor-generator and an AC-DC converter, the bidirectional machine converting mechanical energy to electrical energy and supplying the electrical energy to the rechargeable electrical energy storage system for storage in a first mode and receiving electrical energy from the rechargeable electrical energy storage system and converting it to mechanical energy to supplement engine output in a second mode.

2. The hybrid power system of claim 1, wherein the motor-generator supplies alternating current to the AC-DC converter and the AC-DC converter supplies direct current to the rechargeable electrical energy storage system for storage.

3. The hybrid power system of claim 1, wherein the rechargeable electrical energy storage system supplies direct current to the AC-DC converter and the AC-DC converter converts the direct current to alternating current and supplies it to the motor-generator for conversion to mechanical power for application to the flywheel.

4. The hybrid power system of claim 1, wherein the bidirectional machine includes motor-generator engagement teeth.

5. The hybrid power system of claim 4, wherein the bidirectional machine is directly attached to the second mounting flange and directly engages the flywheel via contact between the flywheel teeth and the motor-generator engagement teeth.

6. The hybrid power system of claim 4, further comprising a gearbox having a gearbox engagement gear with gearbox engagement teeth and at least one transfer gear with transfer gear teeth, wherein the first mounting flange and the second mounting flange are included in the gearbox.

7. The hybrid power system of claim 6, further comprising a third mounting flange, wherein the gearbox is engaged with the flywheel through the third mounting flange.

8. The hybrid power system of claim 7, wherein the gearbox engages the flywheel via contact between the flywheel teeth and the gearbox engagement teeth.

9. The hybrid power system of claim 8, wherein the motor-generator engages the flywheel via contact between the motor-generator engagement teeth and the transfer gear teeth.

* * * * *